(12) United States Patent
Zoppetti et al.

(10) Patent No.: US 6,777,398 B2
(45) Date of Patent: Aug. 17, 2004

(54) PROCESS FOR THE PREPARATION OF CHONDROITIN SULFATES FROM K4 POLYSACCHARIDE AND OBTAINED PRODUCTS

(75) Inventors: Giorgio Zoppetti, Milan (IT); Pasqua Oreste, Milan (IT)

(73) Assignee: IBSA Institut Biochimique S.A., Lugano (CH)

( * ) Notice: Subject to any disclaimer, the term of this patent is extended or adjusted under 35 U.S.C. 154(b) by 0 days.

(21) Appl. No.: 10/274,706

(22) Filed: Oct. 21, 2002

(65) Prior Publication Data

US 2003/0100534 A1 May 29, 2003

(30) Foreign Application Priority Data

Oct. 22, 2001 (IT) .................................... MI2001A2200

(51) Int. Cl.[7] ........................ A61K 31/737; C08B 37/00
(52) U.S. Cl. ......................... 514/54; 514/56; 536/18.7; 536/21; 536/123.1; 536/124
(58) Field of Search ................... 514/54, 56; 536/18.7, 536/21, 123.1, 124

(56) References Cited

U.S. PATENT DOCUMENTS

| 3,895,107 A | 7/1975 | Morrison ................... 424/180 |
| 6,288,044 B1 * | 9/2001 | Zoppetti et al. ............... 514/54 |

FOREIGN PATENT DOCUMENTS

| GB | 2 055 872 A | 3/1981 | ........... C08B/37/08 |
| WO | WO 98/34958 | 8/1998 | ........... C08B/37/00 |
| WO | WO 01/02597 A1 | 1/2001 | ........... C12P/19/26 |

OTHER PUBLICATIONS

H. W. Stuhlsatz and H. Greiling, "The Preparation of Chondroitin 4– and Chondroitin 6–Sulphates," *The Methodology Of Connective Tissue Research*, pp. 129–136, 1976.

Casu, B. and Gennaro U., "A conductimetric method for the determination of sulphate and carboxyl groups in heparin and other mucopolysaccharides," *Carb. Research*, 39:168–176, 1975.

Harenberg, J. and De Vries, J. X., "Characterization Of Heparins By High–Performance Size Exclusion Liquid Chromatography," *J. Chromatography*, 261:287–292, 1983.

Holme, K. R. and Perlin, A. S., "Nuclear Magnetic Resonance Spectra Of Heparin In Admixture With Dermatan Sulfate And Other Glycosaminoglycans 2–D Spectra Of The Chrondroitin Sulfates," *Carb. Research*, 186:301–312, 1989.

Morreale, P. et al., "Comparison of the Antiinflammatory Efficacy of Chondroitin Sulfate and Diclofenac Sodium in Patients with Knee Osteoarthritis," *J. Rheumatology*, 23(8):1385–1391, 1996.

Suzuki, S. "Chondroitinase from *Proteus vulgaris* and *Flavobacterium heparinum*," *Chondroitinases From Bacteria*, 124:911–917.

Yoshida, K. et al., "Analysis of Unsaturated Disaccharides from Glycosaminoglycuronan by High–Performance Liquid Chromatography," *Analytical Biochemistry*, 177:327–332, 1989.

* cited by examiner

*Primary Examiner*—James O. Wilson
*Assistant Examiner*—Ganapathy Krishnan
(74) *Attorney, Agent, or Firm*—Morgan & Finnegan, L.L.P.

(57) ABSTRACT

New process for the preparation of chondroitin sulfates from the bacterial origin polysaccharide named K4, by defructosilation followed by selective sulfation.

23 Claims, 7 Drawing Sheets

Figure 1:
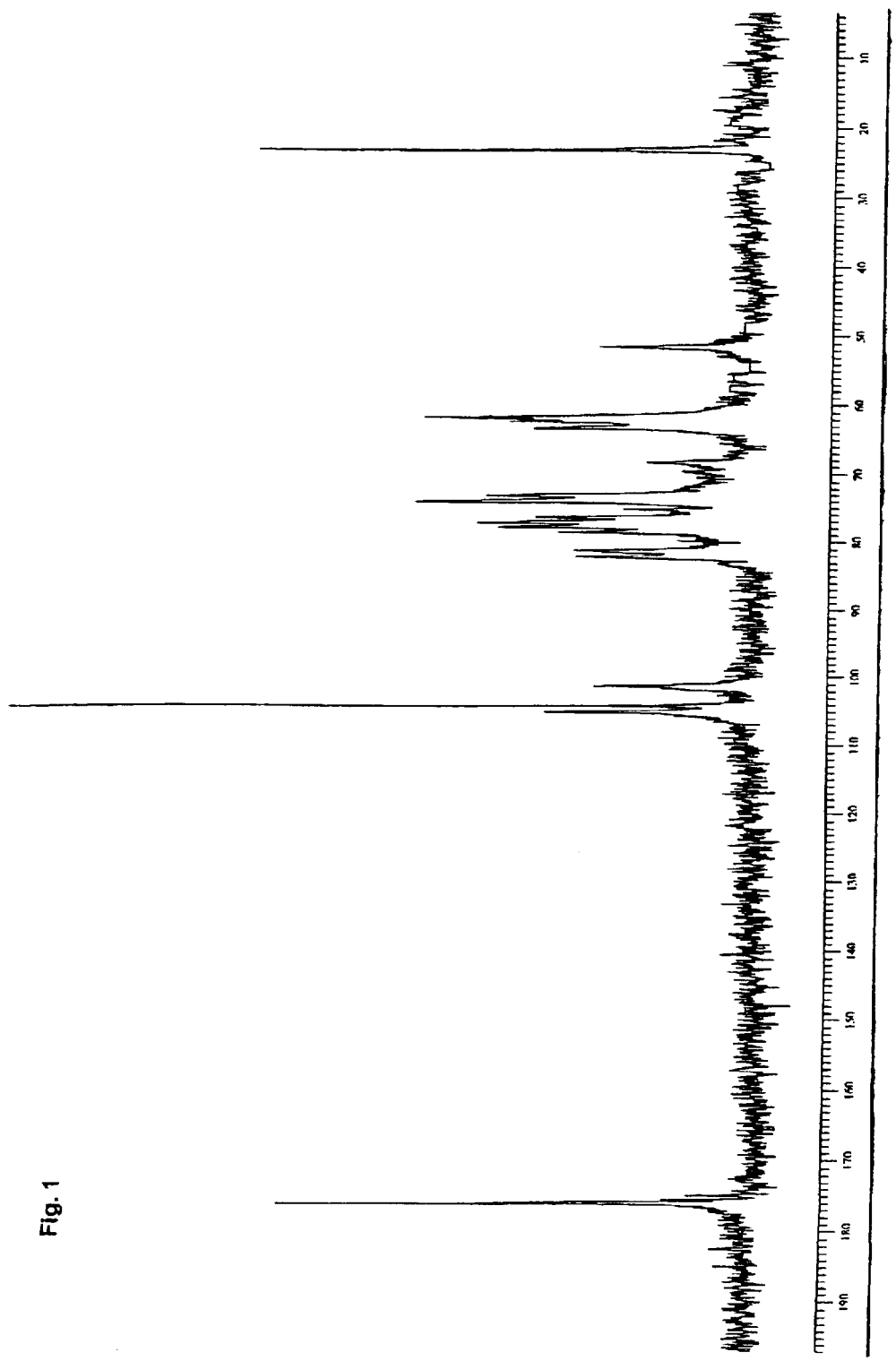

PROCESS FOR THE PREPARATION OF CHONDROITIN SULFATES FROM K4 POLYSACCHARIDE AND OBTAINED PRODUCTS

PRIOR ART

The chondroitin sulfates are natural products present in animal tissues with structural and physiological functions.

The chondroitin sulfates have antiinflammatory activity, they have been classified as SYSADOA (Symptomatic Slow Acting Drug Osteoarthritis) and used in the medium-long term therapy in the treatment of arthritic patients (Morreale P., Manopulo R., Galati M., Boccanera L., Saponati G. and Bocchi L. "Comparison of the antiinflammatory efficacy of chondroitin sulfate and diclofenac sodium in patients with knee osteoarthritis". J. Rheumatol., 23,1385–1391, 1996).

The commercial chondroitin sulfates are obtained by extraction methods from animal tissues and consist of regular disaccharides formed by glucuronic acid and N-acetylgalactosamine sulfated in position 4 and/or 6 (YOSHIDA, K. et al.—Analytical Biochemistry, 177, pp. 327–332 (1989)).

The average molecular weight of the commercial products is about 18,000–20,000 D. The chondroitin sulfate with sulfate group in position 4 (Ch4S) is never present alone in the natural products, bur normally it is joined in the same chain to chondroitin sulfate with sulfate group in position 6 (Ch6S) in percentages ranging from about 10 to 73% and then these sequences are separable with difficulty. Generally a commercial chondroitin sulfate contains about 40% Ch4S and 60% Ch6S.

The K4 polysaccharide may be obtained by fermentation methodologies as disclosed in the patent WO 01/02597.

SUMMARY

Now we have found that by a series of reactions on the K4 polysaccharide from *Escherichia coli* it is possible to obtain chondroitin sulfates having the structure represented by at least 70% by weight by formula (I), the remainder to 100% consisting of non sulfated product.

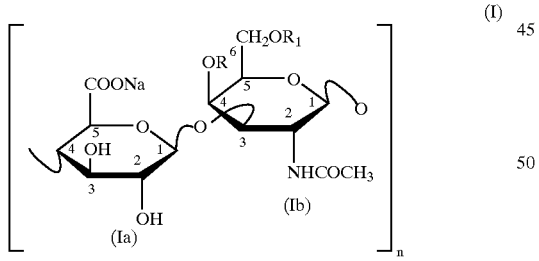

In formula (I), R and $R_1$ equal or different, represent H or $SO_3Na$ provided that R and $R_1$ cannot be both H and n is an integer number ranging from 5 to 50.

In particular when $R=R_1=SO_3Na$ the product is the 4,6-disulfate, when R=H and $R_1=SO_3Na$ the product is the 6-sulfate and when $R=SO_3Na$ and $R_1=H$ the product is the 4-sulfate. The carboxyles/sulfates ratio ranges from 0.7 to 2. (Ia) corresponds to the glucuronic acid structure and (Ib) corresponds to N-acetyl galactosamine.

The above described three products are prepared from a common intermediate obtained from the K4 polysaccharide by a process including the following steps:

a) defructosilation of the K4 polysaccharide by treatment with HCl;
b) passage on ionic exchange column to obtain the acid polysaccharide or b1) selective protection of the carboxyl by formation of the methyl ester;
c) selective protection of the positions 4 and 6 of the galactosamine by dibenzylidenation;
d) protection of the positions 2 and 3 of the glucuronic acid by O-acetilation;
e) deprotection in position 4 and 6 of the galactosamine by the separation of the dibenzylidene by treatment with acetic acid obtaining the common intermediate having structure represented by at least 80% by formula (II)

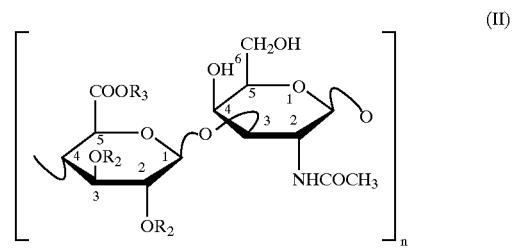

wherein $R_2$=acetyl, $R_3$=Na or $CH_3$ and n=5–100.

In order to obtain the chondroitin sulfates having formula (I) according to the present invention, the product having formula (II) is selectively sulfated and deprotected, acting in the following conditions:

f) To obtain the chondroitin 4,6-disulfate ($R=R_1=SO_3Na$)
  i.) The intermediate (II) is treated with sulfating agent consisting of pyridine-sulfotrioxide in conditions of temperature higher than 20° C. and with a sulfating agent/OH molar ratio between 1:1 and 3:1;
  ii.) The product obtained is liberated from the acetyls of the glucuronic acids by basic treatment;
  iii.) The product is recovered by diafiltration on membrane and drying.

g) To obtain the chondroitin 4-sulfate ($R=SO_3Na$, $R_1=H$)
  i.) The intermediate (II) is treated with triphenylmethyl chloride to selectively protect the position 6 of galactosamine;
  ii.) It is treated with sulfating agent consisting of pyridine-sulfotrioxide in conditions of temperature higher than 20° C. and with a sulfating agent/OH molar ratio between 1:1 and 3:1;
  iii.) The product obtained from triphenylmethyl is liberated by acid treatment;
  iv.) The product obtained is liberated from the acetyls of the glucuronic acid by basic treatment;
  v.) The product is recovered by diafiltration on membrane and drying.

h) To obtain the chondroitin 6-sulfate (R=H, $R_1=SO_3Na$)
  i.) The intermediate (II) is treated with sulfating agent consisting of pyridine-sulfotrioxide in conditions of temperature not higher than 5° C. and with a sulfating agent/OH molar ratio between 1:1 and 3:1;
  ii.) The product obtained is liberated from the acetyls of the glucuronic acid by basic treatment;
  iii.) The product is recovered by diafiltration on membrane and drying.

DETAILED DESCRIPTION OF THE DRAWINGS

Figure 2:
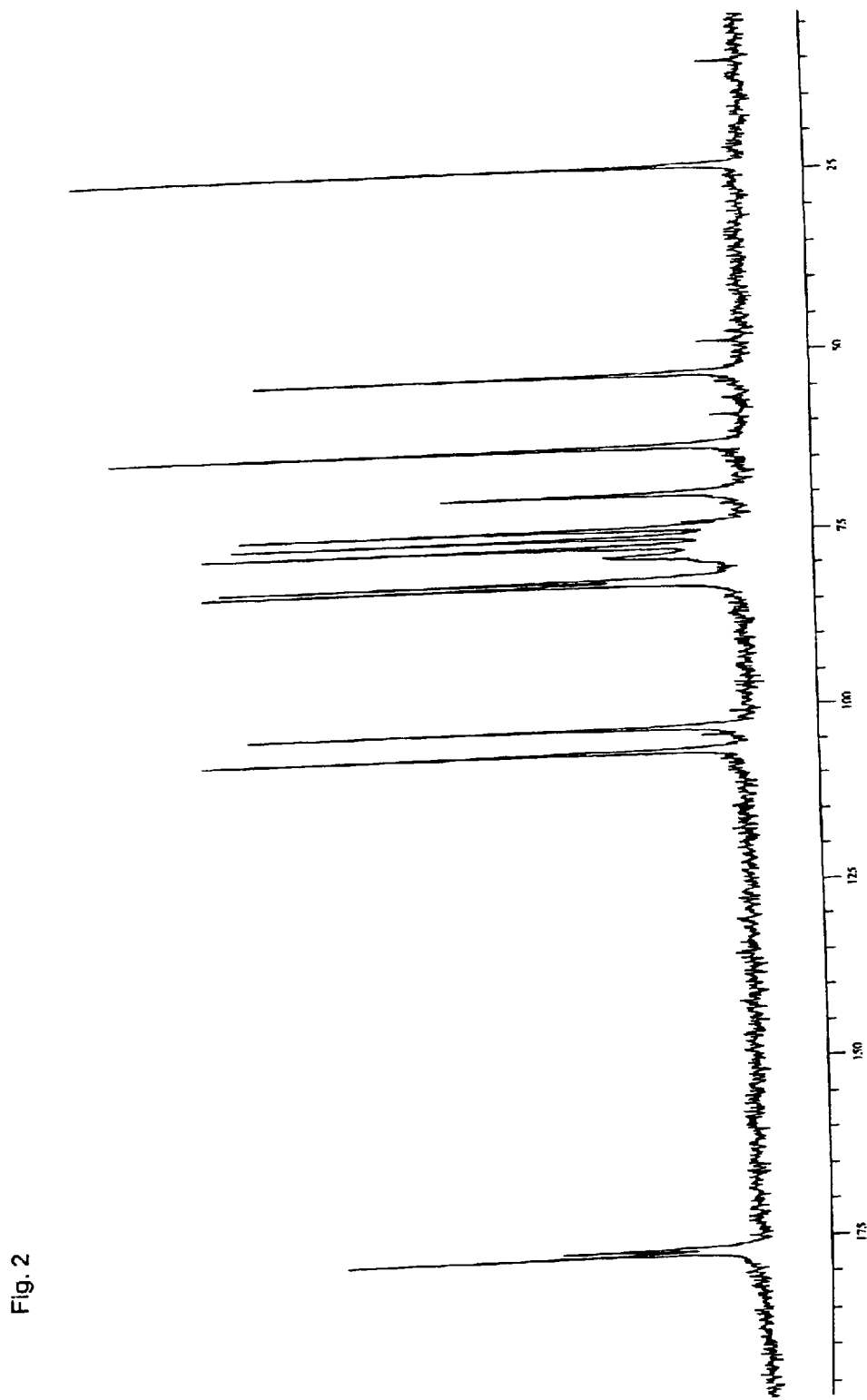
Figure 3:
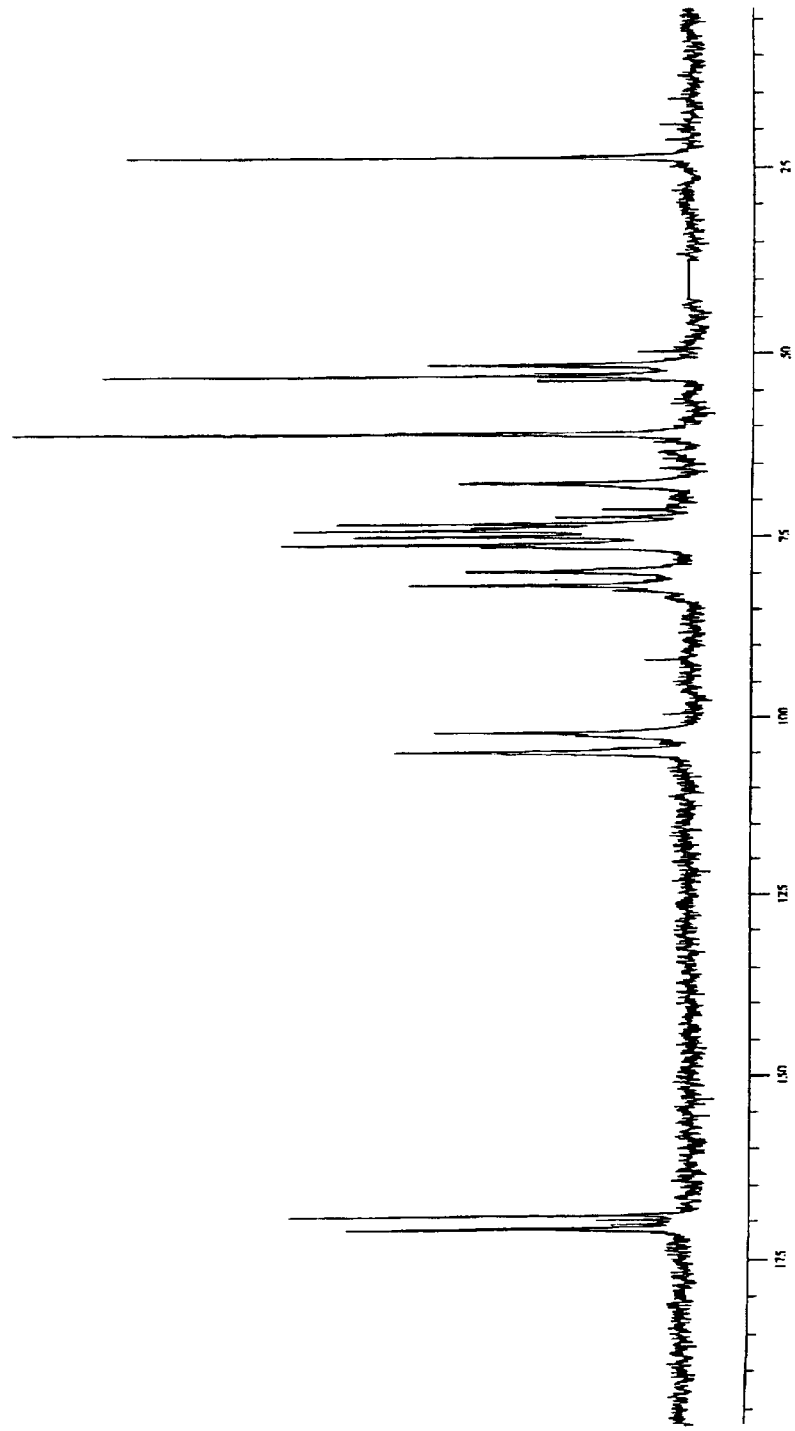
Figure 4:
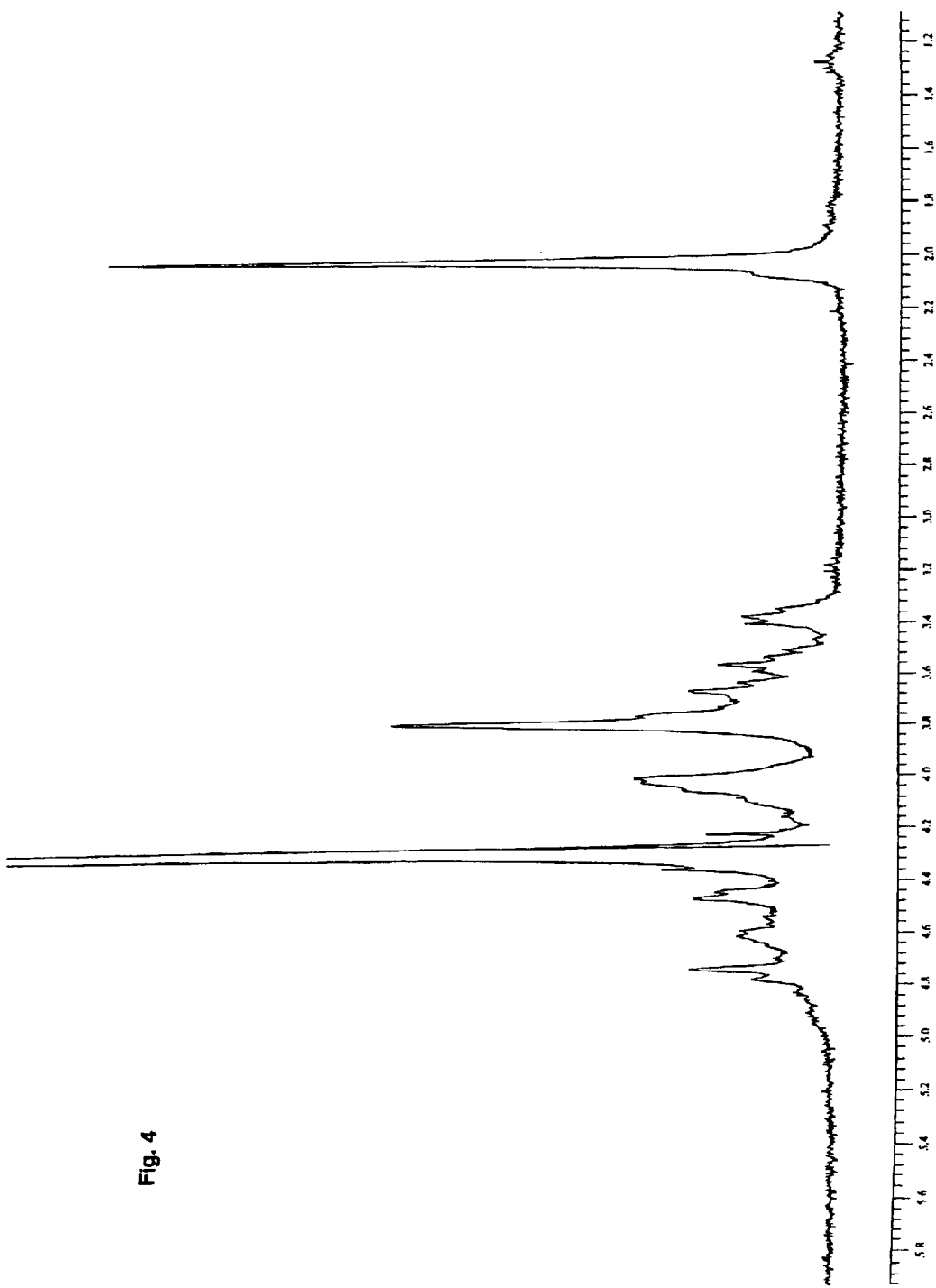
Figure 5:
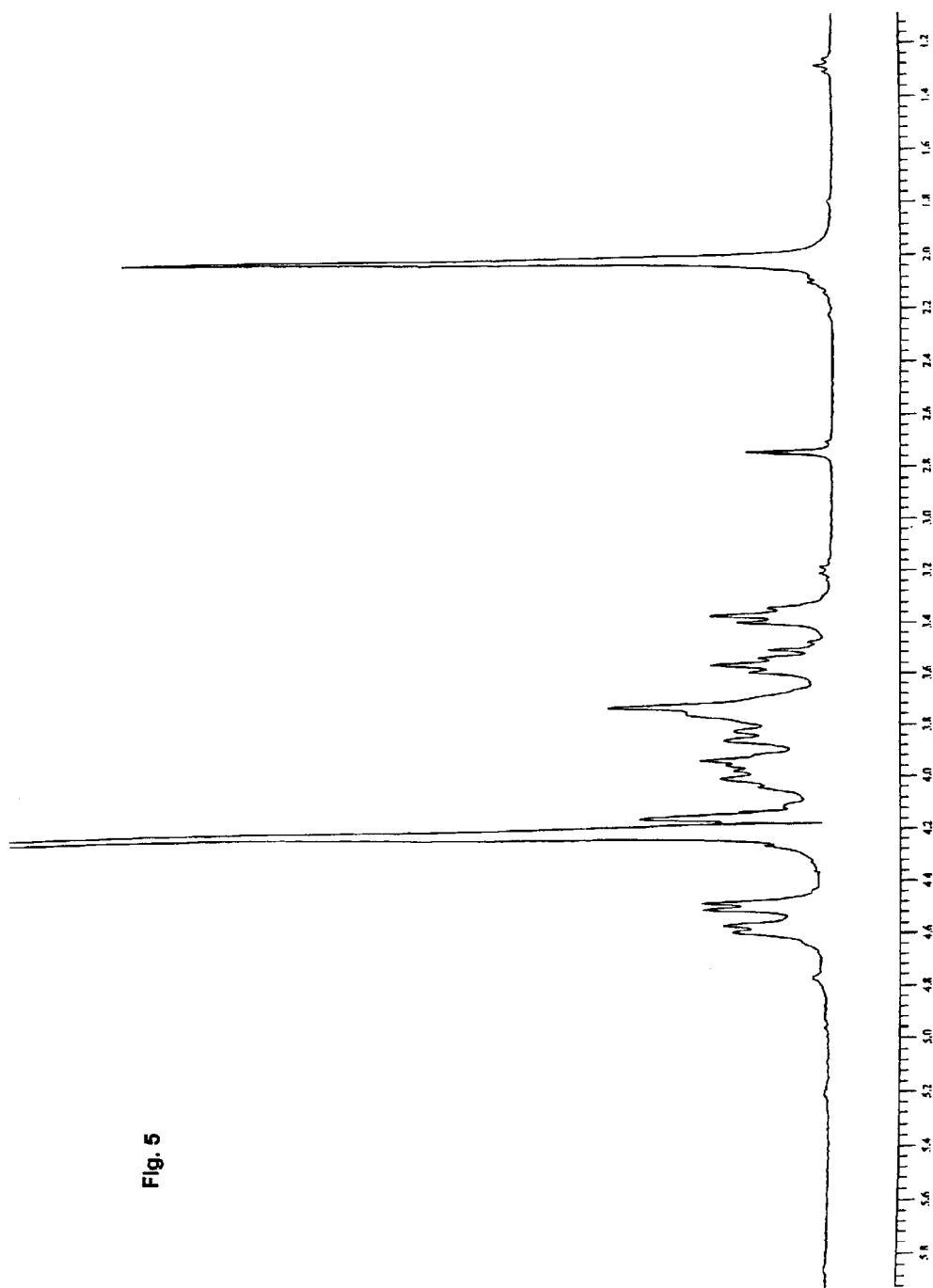
Figure 6:
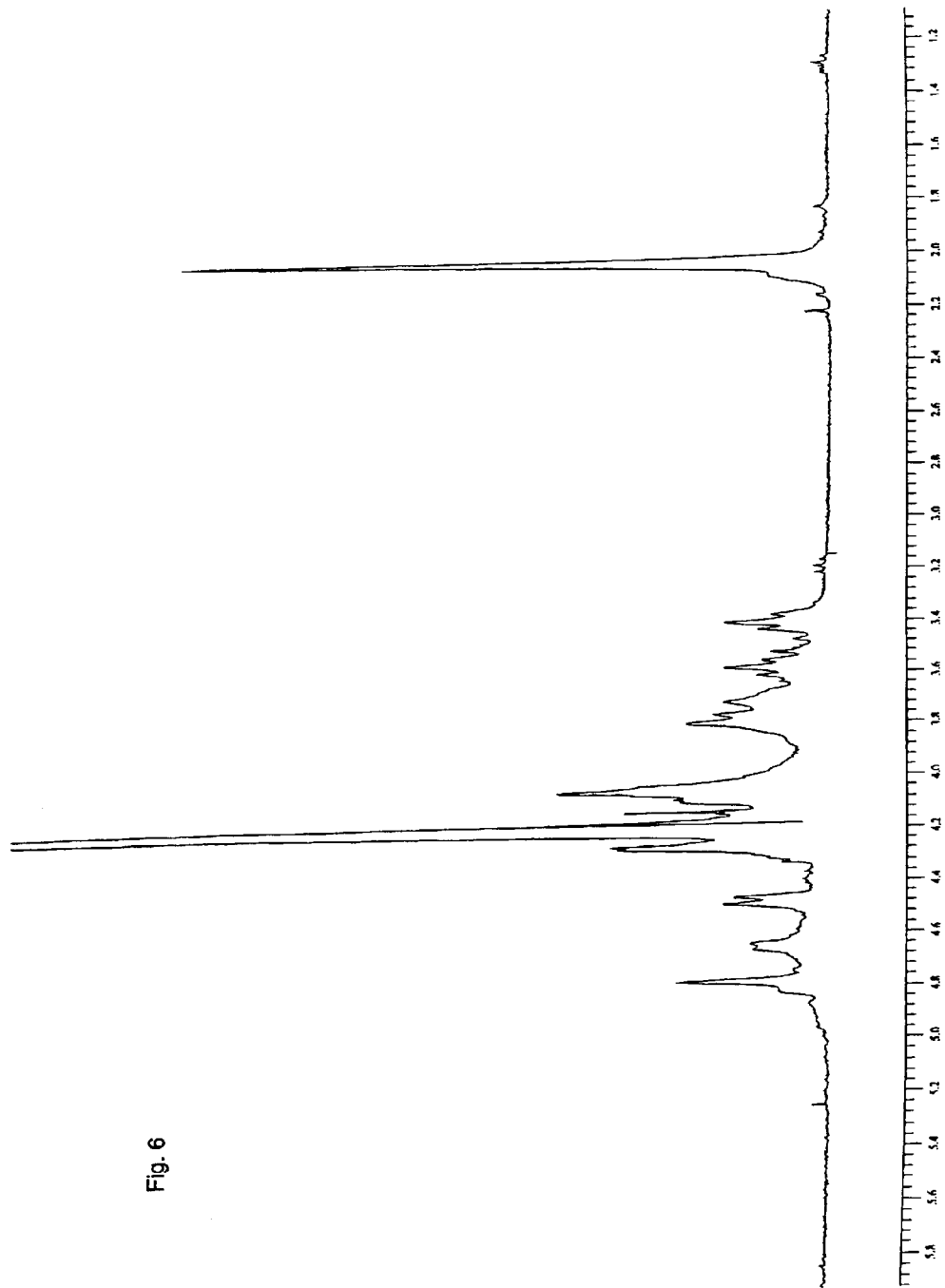
Figure 7:
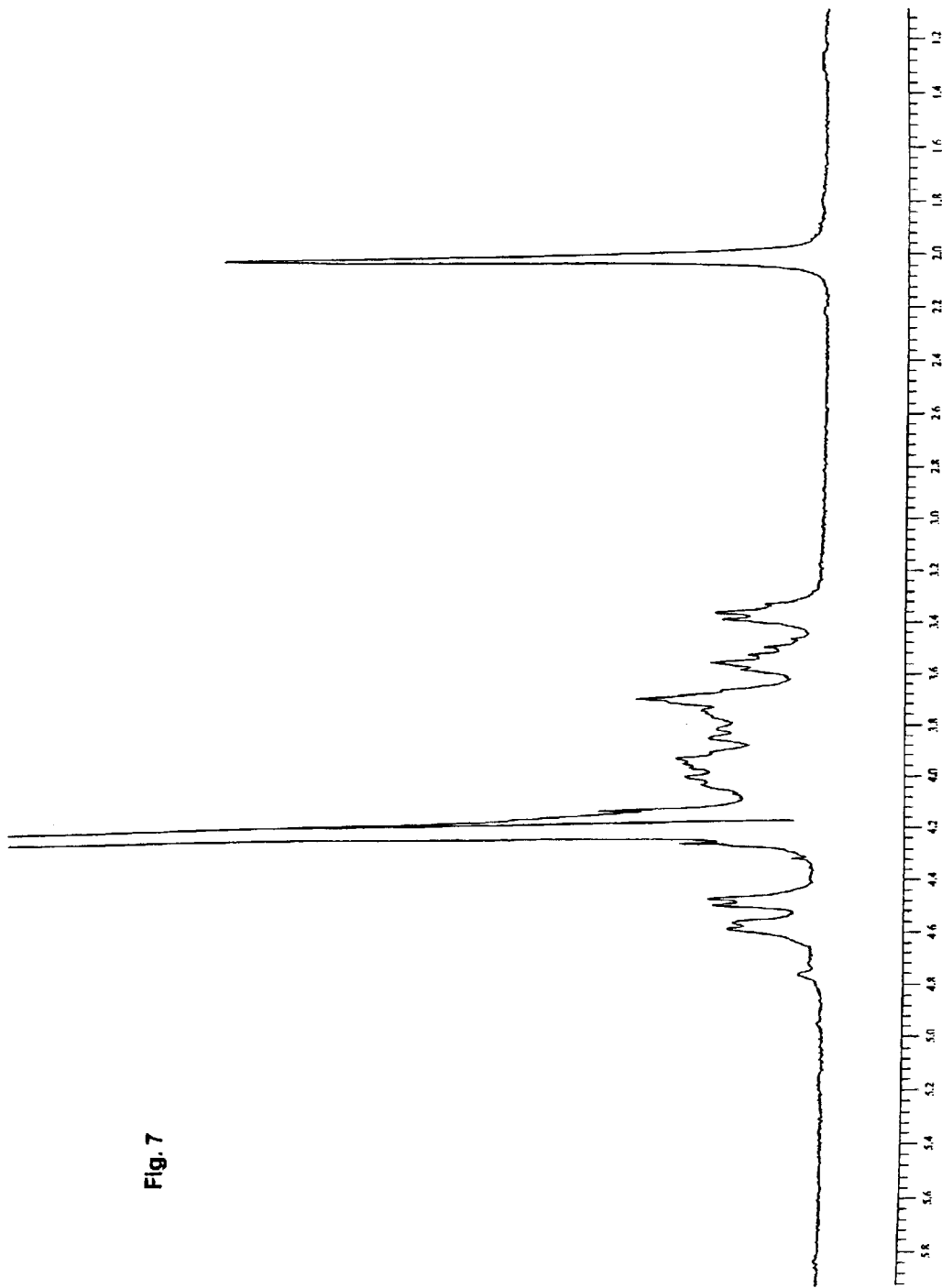

The invention may be further understood with reference to the attached drawings in which:

FIG. 1 shows the $^{13}$C-NMR spectrum of the K4 polysaccharide obtained according to WO 01/02597 and used as starting substance in example 1, FIG. 2 shows the $^{13}$C-NMR spectrum of the defructosylated K4 polysaccharide obtained therefrom according to example 1, FIG. 3 shows the $^{13}$C-NMR spectrum of the methyl ester of glucuronyl-β-1-3-N-acetylgalactosamine acid obtained according to example 2, FIG. 4 shows the $^1$H-NMR spectrum of the deacetilated 2,3-O diacetyl glucuronyl-β-1-3 N-acetylgalactosamine 4-O sulfate acid obtained according to example 3, FIG. 5 shows the $^1$H-NMR spectrum of the deacetilated 2,3-O diacetyl glucuronyl-β-1-3 N-acetylgalactosamine 6 sulfate acid obtained according to example 4, FIG. 6 shows the $^1$H-NMR spectrum of the deacetilated 2,3-O diacetyl glucuronyl-β-1-3 N-acetylgalactosamine 4,6 disulfate acid obtained according to example 5, and FIG. 7 shows the $^1$H-NMR spectrum of the deacetilated methyl ester of 2,3-O diacetyl glucuronyl-β-1-3-N-acetylgalactosamine 6-sulfate acid obtained according to example 7.

DETAILED DESCRIPTION OF THE INVENTION

A new method is disclosed to obtain chondroitin sulfate selectively sulfated in the galactosamine starting from the K4 polysaccharide from *E. coli*. The obtained products correspond for at least 70% to the general formula (I). The method allows to obtain:

the chondroitin 4,6-disulfate;
the chondroitin 4-sulfate, and
the chondroitin 6-sulfate.

The method to obtain the several products provides for the preparation of a common intermediate obtained starting from the K4 polysaccharide from *E. coli* obtained for example as disclosed in WO 01/02597 which:

a) is defructosilated by acidifying with HCl to pH 2.8 an aqueous solution containing 10 g of K4 (0,5–5% solution) and keeping the solution acidified, at 20–25° C. for 24–72 hours. At the end of the reaction it is taken to neutrality with NaOH, if needed it is centrifuged at 15,000 rpm to make the solution clear and it is diafiltered on 1,000 D dialysis membrane to the disappearance of the chlorides and of the free fructose, measured according to the methods described below. The product is kept in solution to proceed with the step b) (acid form) or dried under vacuum at 45° C. to proceed with the step b1) (methyl ester form).

Control of the Chlorides in the Permeate 2 ml of solution of the permeate are taken, 0.1 ml of HNO$_3$ and 1 ml of AgNO$_3$ are added, the solution must result perfectly clear.

Control of the Fructose in the Permeate by HPLC Method
Instruments:
PU 4100 (Philips) HPLC
Rheodyne 7125 with 20 ml loop
Column: Polispher OAKC 300×7.8 mm
Temperature: 40° C.
Mobile Phase: H$_2$SO$_4$ 5–10$^{-3}$ N
Flux: 0.4 ml/min
Pressure: 60 Bar
Detector: refraction index (Perkin Helmer) LC30
Retention Time: 18.7 min In such conditions the fructose must result not determinable.

b) The solution obtained in the step a) is passed on 15–50 ml of cationic exchange (IR-120H+) resin. The resin is washed with demineralized water to the disappearance of the acid in the eluate, then the acid solution is dried under vacuum.

b1) Alternatively to the step b) the methyl ester of the defructosilated K4 polysaccharide is prepared. First a mixture of 1,500–2,500 ml of methanol and 10–15 ml of acetyl chloride is prepared which is kept under stirring for 1–3 hours, and then 10 g of the dried product obtained in the step a) are added. It is kept under stirring for 24 hours at room temperature. It is filtered and the precipitate is washed with 10–30 ml of methanol. The obtained solid is treated a second time with methanol and acetyl chloride for 24 hours and washed with methanol as described above. Finally the product is dried at 45° C. under vacuum.

c) The product obtained in the step b) or b1) is dissolved in 50–150 ml DMF, then added with 30–40 g of benzaldehyde dimethylacetal and with 0.5–2 g of melted p-toluensulfonic acid. The temperature is taken to 60–80° C. for 4–10 h, it is cooled to room temperature and the product is precipitated by dripping of 300–700 ml of acetone, it is filtered under vacuum, it is washed with 50–100 ml of acetone and it is vacuum dried in a stove at 45° C.

d) The product obtained in the step c) is dissolved in 30–60 ml of acetonitrile and then it is added with 40–50 ml of triethylamine, 15–25 ml of acetic anhydride and 50–200 mg of 4-dimethylaminopyridine (DMAP). It is kept under stirring for 1–3 hours, the possible precipitate is filtered and then the product is precipitated with 35–50 ml of isopropyl ether. It is filtered under vacuum, it is washed with 20–40 ml of isopropyl ether and it is vacuum dried at 40° C.

e) The product obtained in the step d) is added with 40–60 ml of acetic acid and 30–40 ml of water. The temperature is taken to 60–80° C. and it is kept under stirring for 2–5 hours, the solvent is evaporated to dryness and the product is solubilized in 40–60 ml of water, it is evaporated to dryness, it is still treated with 40–60 ml of water and finally the product is dried.

The obtained product forms the common intermediate corresponding for at least 80% to the formula (II).

This intermediate is sulfated in three different conditions to obtain the chondroitin 4,6-disulfate (f), the chondroitin 4-sulfate (g) and the chondroitin 6-sulfate (h), respectively.

f) To obtain the chondroitin 4,6-disulfate:

i.) 4–6 g of the common intermediate obtained in the step e) are solubilized in 60–90 ml of anhydrous DMF and added in a time equal to 10–20 minutes with 5–15 g of pyridine-sulfotrioxide dissolved in 40–90 ml of anhydrous DMF. The solution is kept under stirring at 40–60° C. for 14–24 hours. The solution is taken to room temperature and precipitated with 400–800 ml of acetone saturated with NaCl. It is filtered and the solid is solubilized with 200–400 ml of demineralized water and it is neutralized with 1 N NaOH.

ii.) The solution obtained in the step f/i) is heated to 30–50° C. and added with 60–90 ml of 0.2–0.3 N NaOH. The temperature of 30–50° C. is maintained for 1–3 hours, then the solution is cooled to room temperature and neutralized with 1N hydrochloric acid. The solution is diafiltered on a spiral wrapped membrane of 1,000 D to a permeate conductivity <10 μS. The concentrate is taken to a little volume by concentration under vacuum and freeze-dried.

g) To obtain the chondroitin 4-sulfate:
  i.) The common intermediate obtained in the step e) is solubilized in 40–60 ml of anhydrous pyridine, the solution is heated to 40–60° C. and in an interval of 10–30 minutes 10–20 g of triphenylmethyl chloride dissolved in 30–50 ml of anhydrous pyridine are added. The solution is maintained at 40–60° C. for 6–15 hours and then it is cooled to room temperature. The product is precipitated by addition of 300–900 ml of isopropanol. The product is filtered, washed with 100–200 ml of isopropanol and dried in a stove under vacuum at 45° C.
  ii.) The product obtained in the step g/i) is solubilized in 60–90 ml of anhydrous DMF and added in a time of 10–20 minutes with 5–15 g of pyridine-sulfotrioxide dissolved in 40–90 ml of anhydrous DMF. The solution is left under stirring at 20–25° C. for 14–24 hours.
  iii.) The solution obtained in the step g/ii) is added with 100–200 ml of demineralized water, it is acidified to pH 2.7 with concentrated hydrochloric acid and kept under stirring for 3–5 hours obtaining the precipitation of the triphenylcarbinol. The precipitate is separated from the solution by centrifugation at 15,000 rounds per minute and the solution is neutralized with 1 N NaOH.
  iv.) The solution obtained in the step g/iii) is heated to 30–50° C. and added with 60–90 ml of 0.2–0.3 N NaOH. This temperature is maintained for 1–3 hours, then the solution is cooled to room temperature and neutralized with 1N hydrochloric acid. The solution is diafiltered on a spiral wrapped membrane of 1,000 D to a permeate conductivity <10 $\mu$S. The solution is then concentrated to a little volume by concentration under vacuum and freeze-dried.

h) To obtain the chondroitin 6-sulfate:
  i) 4–6 g of the common intermediate obtained in the step e) are solubilized in 80–120 ml of anhydrous DMF and the solution is cooled to 0–5° C. Then 12–15 g of pyridine-sulfotrioxide dissolved in 80–120 ml of anhydrous DMF are added in a time equal to 10–20 minutes. The solution is kept under stirring at 0–5° C. for 1–3 hours. The solution is then cooled to room temperature and precipitated with 400–800 ml of acetone saturated with NaCl. The mixture is filtered and the solid is solubilized with 200–400 ml of demineralized water and the obtained solution is neutralized with 1 N NaOH.
  ii.) The solution obtained in the step h/i) is heated to 30–50° C. and added with 60–90 ml of 0.2–0.3 N NaOH. This temperature is maintained for 1–3 hours, and then it is cooled to room temperature and it is neutralized with 1 N hydrochloric acid. The solution is diafiltered on a spiral wrapped membrane of 1,000 D to a permeate conductivity <10 $\mu$S. The solution is then concentrated to a little volume by concentration under vacuum and freeze-dried.

Analysis of the Final Products:

The structure of the obtained compounds has been defined by proton and carbon thirteen nuclear magnetic resonance (NMR) technique in solutions of 5% heavy water at 80° C. and at room temperature, using a 300 MHz Varian instrument equipped with 5 mm multiprobe and variable temperature. The signal assignments refer to Holme et al "Nuclear magnetic resonance spectra of heparin in admixture with dermatan sulfate and other glycosaminoglycans. 2D spectra of chondroitin sulfates" Carbohydr. Res. 186, 301–312, 1989). Moreover the structure has been defined by strong anionic exchange HPLC method for the determination of the unsaturated constitutive disaccharides (Volpi N., Sandri I. and Venturelli T. "Activity of chondroitin ABC lyase and hyaluronidase on free radical degraded chondroitin sulfate". Carbohydr. Res., 279, 193–200,1995).

The sulfate content per disaccharidic unit ($SO_3$/COO) has been determined by conductimetric method according to Casu et al. ("A conductimetric method for the determination of sulphate and carboxyl groups in heparin and other mucopolysaccharides". Carbohydr. Res., 39, 168–176, 1975). The molecular weight (MW) has been determined according to Harenber et al. ("Characterization of heparins by high-performance size exclusion liquid chromatography", J. Chromatogr., 261, 287–292,1983) and the activity of enzymatic degradation by UV determination of the formation of the double bond in the not reducing terminal (Suzuki, S., Methods in enzymology, 28, 911–917,1972).

In particular we found that, by the process according to the present invention one may obtain:
  a product having formula (I) wherein R is $SO_3Na$ ranging from 70% to 90% and $R_1$ is $SO_3Na$ ranging from 10 to 25%, the remaining percentage being H;
  a product having formula (I) wherein R is $SO_3Na$ ranging from 20% to 35% and $R_1$ is $SO_3Na$ ranging from 80 to 95%, the remaining percentage being H;
  a product having formula (I) wherein R is $SO_3Na$ ranging from 80% to 95% and $R_1$ is $SO_3Na$ ranging from 80 to 95%, the remaining percentage being H.

Moreover the invention includes the products having formula (I) wherein Na is substituted by K, Li, Ca, Mg and Mn.

By the process of the present invention chondroitin sulfates having average molecular weight ranging from 10,000 to 25,000 D or between 12,000 and 15,000 D or between 5,000 and 10,000 D or between 6,000 and 8,000 D may be obtained.

The following examples are reported for illustrative aim of the invention. The chemico-physical characteristics of the obtained products are reported in Table 1, and the AC chondroitinase activity is reported in Table 2.

EXAMPLE 1

Preparation of the Common Intermediate
(Acid Way)

Defructosilation of the K4 Polysaccharide 100 g of K4 polysaccharide obtained as disclosed in WO 01/02597 and having the $^{13}$C-NMR spectrum shown in FIG. 1 are dissolved in 10 liters of demineralized water.

The solution is then acidified at pH 2.8 by addition of HCl (10% sol.) and kept under stirring at 20–25° C. for 48 hours. At the end of the reaction the solution is neutralized with NaOH (5% sol.). The solution does not appear clear, then it is centrifuged at 15,000 rpm on Sorval RC-5B centrifuge for 15 minutes at 10° C. The resulting solution, clear, is diafiltered on a 1,000 D membrane to disappearance of chlorides and fructose measured in the permeate. About 15 liters of permeate are obtained. The concentrate is taken to little volume on rotavapor under vacuum at a temperature equal to 45–50° C. and freeze-dried. 70 g of defructosilated K4 are obtained with the $^{13}$C-NMR shown in FIG. 2.

Preparation of the Acid Defructosilated K4

10 g of defructosilated K4 are dissolved in 400 ml of demineralized water. The obtained solution is passed on 25 ml of cationic exchange resin (IR-120H$^+$). The resin is washed with demineralized water to disappearance of the acid in the eluate, then the acid solution is dried under vacuum.

9.23 g of product are obtained.

Preparation of the glucuronyl-β1-3-4,6 O-dibenzyliden-N-acetylgalactosamine Acid The product obtained in the preceding step is dissolved in 93 ml of DMF, and then it is added with 37 g of benzaldehyde dimethylacetal and with 1 g of melted p-toluensulfonic acid. The mixture is heated to 70° C. for 6 h and then cooled to room temperature. The product is precipitated by dripping of 560 ml of acetone, filtered under vacuum, washed with 70 ml of acetone and vacuum dried in a stove at 45° C.

8.93 g of product are obtained.

Preparation of 2,3-O-diacetyl glucuronyl-β1-3-4,6 O-dibenzyliden-N-acetylgalactosamine Acid The product obtained in the preceding step is dissolved in 43 ml of acetonitrile, then added with 46 ml of triethylamine, 19 ml of acetic anhydride and 100 mg of 4-dimethylaminopyridine (DMAP). The mixture is kept under stirring at room temperature for 1 hour, the formed precipitate is filtered and then the product is precipitated with 43 ml of isopropyl ether. The product is filtered under vacuum, washed with 20 ml of isopropyl ether and vacuum dried at 40° C.

8.93 g of product are obtained.

Preparation of 2,3-O-diacetyl glucuronyl-β1-3-N-acetylgalactosamine Acid

The product obtained in the preceding step is added with 54 ml of acetic acid and 36 ml of water. The mixture is heated to 75° C. and kept under stirring for 3 hours, the solvent is evaporated to dryness and the solid product in 50 ml of water. The operations of evaporating to dryness, redissolving in 50 ml of water and evaporating to dryness are repeated once again.

5.8 g of common intermediate are obtained.

EXAMPLE 2

Preparation of the Common Intermediate
(Methyl Ester Way)

Preparation of the Methyl Ester of glucuronyl-β1-3-N-acetylgalactosamine Acid

A mixture consisting of 2,000 ml of methanol and 13 ml of acetyl chloride is kept under stirring for 2 hours and then added with 10 g of the defructosilated product obtained as described in the Example 1. The obtained mixture is kept under stirring for 24 hours at room temperature (20–25° C.). The solid product is filtered and washed with 20 ml of methanol. The solid product is treated one more time with 2,000 ml of methanol and 13 ml of acetyl chloride and it is washed with 20 ml of methanol as described above and it is vacuum dried in a stove at 45° C.

6.63 g of product are obtained having the $^{13}$C-NMR spectrum shown in FIG. 3.

Preparation of the Methyl Ester of glucuronyl-β1-3-4,6 O-dibenzyliden-N-acetylgalactosamine Acid The product obtained in the preceding step is dissolved in 66 ml of DMF and then it is added with 27 g of benzaldehyde dimethylacetal and with 0.7 g of melted p-toluensulfonic acid. The temperature is taken to 70° C. for 6 h, it is cooled to room temperature and the product is precipitated by dripping of 270 ml of acetone, it is filtered under vacuum, it is washed with 70 ml of acetone and it is vacuum dried in a stove at 45° C.

6.67 g of product are obtained.

Preparation of the Methyl Ester of 2,3-O diacetyl glucuronyl-β1-3-4,6 O-dibenzyliden-N-acetylgalactosamine Acid The product obtained in the preceding step is dissolved in 32 ml of acetonitrile and then added with 35 ml of triethylamine, 14 ml of acetic anhydride and 90 mg of 4-dimethylaminopyridine (DMAP). The mixture is kept under stirring at room temperature for 1 hour, the formed precipitate is filtered and then the product is precipitated with 32 ml of isopropyl ether. The product is filtered under vacuum, washed with 20 ml of isopropyl ether and vacuum dried at 40° C.

6.67 g of product are obtained.

Preparation of the Methyl Ester of 2,3-O diacetyl glucuronyl-β1-3-N-acetylgalactosamine Acid The product obtained in the preceding step is added with 40 ml of acetic acid and 27 ml of water. The mixture is heated to 100° C. and kept under stirring for 3 hours, the solvent is evaporated to dryness and the dry product is solubilized in 50 ml of water, it is taken back to dryness, it is still taken back with 50 ml of water and finally it is taken once again to dryness.

5.17 g of common intermediate are obtained.

EXAMPLE 3

Preparation of the Chondroitin 4-Sulfate
(Acid Way)

Preparation of 2,3-O diacetyl glucuronyl-β1-3-6-O trityl-N-acetylgalactosamine Acid In this example and in the following ones, with the term "trityl" we mean "triphenylmethyl". 5.8 g of the common intermediate obtained as described in the Example 1 are solubilized in 49 ml of anhydrous pyridine, the solution is heated to 50° C. and in a time equal to 15 minutes 13 g of trityl chloride are added dissolved in 38 ml of anhydrous pyridine. The mixture is kept at 50° C. for 9 hours and then cooled to room temperature. The product is precipitated by addition of 600 ml of isopropanol, filtered, washed with 100 ml of isopropanol and dried in a stove under vacuum at 45° C. 4.15 g of product are obtained.

Sulfation of 2,3-O diacetyl glucuronyl-β1-3-6-0 trityl-N-acetylgalactosamine Acid The product obtained in the preceding step is solubilized in 74 ml of anhydrous DMFA and added in a time equal to 10 minutes with 9.2 g of pyridine-sulfotrioxide dissolved in 54 ml of anhydrous DMF. The solution is kept under stirring at 20–25° C. for 8 hours.

Detritylation of 2,3-O diacetyl glucuronyl-β1-3-6-O trityl-N-acetylqalactosamine 4-O Sulfate Acid The solution obtained in the preceding step is added with 140 ml of demineralized water, acidified to pH 2.7 with concentrated hydrochloric acid and kept under stirring for 4 hours obtaining the precipitation of triphenylcarbinol. The precipitate is separated from the solution by centrifugation at 15,000 rounds per minute and the solution is neutralized with 1 N NaOH.

Deacetilation of 2,3-O diacetyl glucuronyl-β1-3 N-acetylgalactosamine 4-O Sulfate Acid The solution obtained in the preceding step is heated to 40° C. and added with 95 ml of 0.2 N NaOH. The obtained solution is kept at 40° C. for 2 hours, then it is cooled to room temperature and neutralized with 1 N hydrochloric acid. The solution is diafiltered on spiral membrane wrapped by 1,000 D to a permeate conductivity <10 µS. The obtained solution is concentrated to a little volume by vacuum concentration and freeze-dried. 1.86 g of product having the chemico-physical characteristics described in Table 1 and the $^1$H-NMR spectrum shown in FIG. 4 are obtained. In particular the obtained product has a chondroitin 4-sulfate titer equal to 71% and moreover it contains 7% of not sulfated product and 18% of chondroitin 4,6-disulfate.

EXAMPLE 4

Preparation of the Chondroitin 6-Sulfate (Acid Way)

Sulfation of 2,3-O diacetyl glucuronyl-β1-3 N-acetylgalactosamine Acid 5.8 g of common intermediate obtained as described in the Example 1 are solubilized in 116 ml of anhydrous DMF. The solution is cooled to 0–5° C. and added with 19.3 g of pyridine-sulfotrioxide under stirring at 0–5° C. for 1 hour. The product is precipitated with 580 ml of acetone saturated with NaCl. The solid product is solubilized with 280 ml of demineralized water and then neutralized with 1 N NaOH.

Deacetilation of 2,3-O diacetyl glucuronyl-β1-3 N-acetylgalactosamine 6 Sulfate Acid The solution obtained in the preceding step is added with 200 ml of 0.2 N NaOH, kept at room temperature for 2 hours and then neutralized with 1 N hydrochloric acid. The solution is diafiltered on spiral membrane wrapped by 1,000 D to a permeate conductivity <10 μS. The concentrate is taken to a little volume by vacuum concentration and freeze-dried. 4.41 g of product having the chemico-physical characteristics described in Table 1 and the $^1$H-NMR spectrum shown in FIG. 5 are obtained. In particular the obtained product has a chondroitin 6-sulfate titer equal to 60% and moreover it contains 30% of chondroitin 4,6 disulfate.

EXAMPLE 5

Preparation of the Chondroitin 4,6-Disulfate (Acid Way)

Sulfation of 2,3-O diacetyl glucuronyl-β1-3 N-acetylgalactosamine Acid 5.8 g of common intermediate obtained as described in the Example 1 are solubilized in 116 ml of anhydrous DMF. The solution is added with 19.3 g of pyridine-sulfotrioxide dissolved in 111 ml of anhydrous DMF in a 10 minutes interval. The solution is kept under stirring at 50° C. for 18 hour. The product is precipitated with 580 ml of acetone saturated with NaCl. The obtained solid product is solubilized with 280 ml of demineralized water and then neutralized with 1 N NaOH.

Deacetilation of 2,3-O diacetyl glucuronyl-β1-3 N-acetylgalactosamine 4,6 Disulfate Acid The solution obtained in the preceding step is added with 200 ml of 0.2 N NaOH, kept at room temperature for 2 hours and neutralized with 1 N hydrochloric acid. The solution is diafiltered on spiral membrane wrapped by 1,000 D to a permeate conductivity <10 μS. The concentrate is taken to a little volume by vacuum concentration and freeze-dried. 4.41 g of product having the chemico-physical characteristics described in Table 1 and the $^1$H-NMR spectrum shown in FIG. 6 are obtained. In particular the obtained product has a titer in chondroitin 4,6-disulfate equal to 90%, the difference to 100% consisting of not sulfated chondroitin.

EXAMPLE 6

Preparation of the Chondroitin 4-Sulfate (Methyl Ester Way)

Preparation of the Methyl Ester of 2,3-O diacetyl glucuronyl-β1-3-6-O trityl-N-acetylgalactosamine Acid 5.2 g of the common intermediate obtained as described in the Example 2 are solubilized in 44 ml of anhydrous pyridine, the solution is heated to 50° C. and 13 g of trityl chloride dissolved in 38 ml of anhydrous pyridine are added in a time equal to 15 minutes. The mixture is kept at 50° C. for 9 hours and then it is cooled to room temperature and the product is precipitated with 80 ml of isopropanol. The product is filtered, washed with 100 ml of isopropanol and dried in a stove under vacuum at 45° C. 5.49 g of product are obtained.

Sulfation of the Methyl Ester of 2,3-O diacetyl glucuronyl-β1-3-6-O trityl-N-acetylgalactosamine Acid The product obtained in the preceding step is solubilized in 97 ml of anhydrous DMF and added in a 10 minute time with 13 g of a pyridine-sulfotrioxide dissolved in 71 ml of anhydrous DMF. The solution is kept under stirring at 20–25° C. for 8 hours.

Detritylation of the Methyl Ester of 2,3-O diacetyl glucuronyl-β1-3-6-O trityl-N-acetylgalactosamine 4-O Sulfate Acid The solution obtained in preceding step is added with 180 ml of demineralized water, acidified to pH 2.7 with concentrated hydrochloric acid and kept under stirring for 4 hours obtaining the precipitation of the triphenylcarbinol. The precipitate is separated from the solution by centrifugation at 15,000 revolutions per minute and the solution is neutralized with 1 N NaOH.

Deacetilation of the Methyl Ester of 2,3-O diacetyl glucuronyl-β1-3 N-acetylgalactosamine 4-O Sulfate Acid The solution obtained in preceding step is heated to 40° C. added with 127 ml of 0.2 N NaOH and kept at 40° C. for 2 hours, then it is cooled to room temperature and it is neutralized with 1 N hydrochloric acid. The solution is diafiltered on spiral membrane wrapped by 1,000 D to a permeate conductivity <10 μS. The concentrate is taken to a little volume by vacuum concentration and freeze-dried. 1.5 g of product having the chemico-physical characteristics described in Table 1 and the $^1$H-NMR spectrum similar to that one of the Example 3 are obtained. In particular the product has a titer in chondroitin 6-sulfate equal to 71%, and moreover it contains 7% of not sulfated product and 18% of chondroitin 4,6-disulfate.

EXAMPLE 7

Preparation of the Chondroitin 6-Sulfate (Methyl Ester Way)

Preparation of the Methyl Ester of 2,3-O diacetyl glucuronyl-β1-3-N-acetylgalactosamine Acid 5.2 g of the common intermediate obtained as described in the Example 2 are solubilized in 104 ml of anhydrous DMF. The solution is cooled to 0–5° C. and added with 17.3 g of pyridine-sulfotrioxide dissolved in 100 ml of anhydrous DMF in a time equal to 10 minutes. The solution is kept under stirring at 0–5° C. for 1 hour. The product is precipitated with 520 ml of acetone saturated with NaCl. The solid is solubilized with 105 ml of demineralized water and neutralized with 1 N NaOH.

Deacetilation of the Methyl Ester of 2,3-O diacetyl glucuronyl-β1-3-N-acetylgalactosamine 6-sulfate Acid The solution obtained in preceding step is added with 178 ml of 0.2 N NaOH, kept at room temperature for 2 hours and neutralized with 1 N hydrochloric acid. The solution is diafiltered on spiral membrane wrapped by 1,000 D to a permeate conductivity <10 μS. The concentrate is taken to a little volume by vacuum concentration and freeze-dried. 3.23 g of product having the chemico-physical characteristics described in Table 1 and the $^1$H-NMR spectrum showed in FIG. 7 are obtained. In particular the product has a titer in chondroitin 6-sulfate equal to 44% and it contains 14% of chondroitin 4,6-disulfate and the remaining part to 100 of not sulfated chondroitin.

EXAMPLE 8

Preparation of the Chondroitin 4,6-disulfate (Methyl Ester Way)

Sulfation of the Methyl Ester of 2,3-O diacetyl glucuronyl-β1-3-N-acetylgalactosamine Acid 5.17 g of the common intermediate obtained as described in the Example 2 are solubilized in 104 ml of anhydrous DMF. The solution is added with 17.3 g of pyridine-sulfotrioxide dissolved in 100 ml of anhydrous DMF in a time equal to 10 minutes. The solution is kept under stirring at 50° C. for 18 hours. The product is precipitated with 580 ml of acetone saturated with NaCl and the obtained solid is solubilized with 105 ml of demineralized water and then neutralized with 1 N NaOH.

Deacetilation of the Methyl Ester of 2,3-O diacetyl glucuronyl-β1-3 N-acetylgalactosamine 4,6-disulfate Acid The solution obtained in preceding step is added with 178 ml of 0.2 N NaOH, kept at room temperature for 2 hours and neutralized with 1 N hydrochloric acid. The solution is diafiltered on spiral membrane wrapped by 1,000 D to a permeate conductivity <10 μS. The concentrate is taken to a little volume by vacuum concentration and freeze-dried. 3.23 g of product having the chemico-physical characteristics described in Table 1 and the $^1$H-NMR spectrum similar to that one of the Example 5 are obtained. In particular the obtained product has a titer in chondroitin 4,6-disulfate equal to 85% and it contains 15% of not sulfated chondroitin.

Characteristics of the Products Obtained in the above Reported Examples

TABLE 1

Chemico-physical characteristics of the obtained products:

| Example | Composition | SO$_3$/COO | Average MW |
|---|---|---|---|
| Ex. 1 | 100% not sulfated | 0 | 13,500 |
| Ex. 2 | 100% not sulfated | 0 | 11,000 |
| Ex. 3 | (71% 4S, 7% not sulfated product and 18% 4,6diS) | 1.07 | 10,700 |
| Ex. 4 | (60% 6S and 30% 4,6diS) | 1.2 | 13,366 |
| Ex. 5 | (90% 4,6diS and 10% not sulfated product) | 1.8 | 12,300 |
| Ex. 6 | (71% 6S, 18% 4,6diS and 7% not sulfated) | 1.07 | 8,500 |
| Ex. 7 | (44% 6S, 14% 4,6diS and 62% not sulfated product) | 0.72 | 10,200 |
| Ex. 8 | (85% 4,6diS and 15% not sulfated) | 1.7 | 6,400 |

For the recognition of the chondroitin sulfates the following method, based on the AC chondroitinase activity, has been used too. 0.025 units of AC chondroitinase (Seikagaku Corporation) dissolved in 100 μl of 0.02 M, pH 7.3, TRIS-HCl buffer, are added to a substrate solution containing 1.8 mg in 500 μl of 0.4 M, pH 7.3, TRIS-HCl buffer thermostated at 37° C. At defined intervals, 120 μl of the solution in incubation are taken and the reaction is stopped by addition of 1 ml of 50 mM KCl pH 1.8. After centrifugation on Eppendorf centrifuge with Eppendorf test-tubes for 5', the solution is read at 232 μm against a buffer blank. The results are reported in Table 2.

TABLE 2

AC chondroitinase activity

| | Expected result | Activity |
|---|---|---|
| Ex. 3 | 4 sulfate | 41.9% |
| Ex. 4 | 6 sulfate | 59% |
| Ex. 5 | 4,6 disulfate | 40% |
| Ex. 6 | 4 sulfate | 80% |
| Ex. 7 | 6 sulfate | 88% |
| Ex. 8 | 4,6 disulfate | 41% |

What is claimed is:

1. A process for the preparation of chondroitin sulfates having at least 70% of formula (I), the remainder to 100% consisting of non sulfated chondroitin,

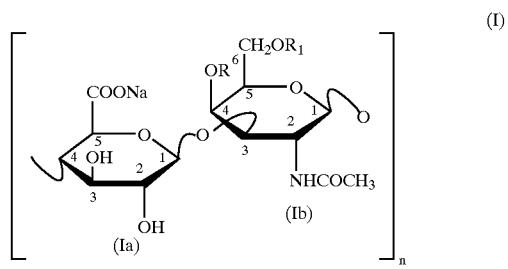

wherein R and R$_1$, same or different, represent H or SO$_3$Na, provided that R and R$_1$ cannot be both H, and n is an integer number ranging from 5 to 50, characterized in that said process uses as a starting material a K4 polysaccharide from *Escherichia coli* and includes the following steps:

a) defructosilation of the K4 polysaccharide by treatment with HCl;

b) passage on a ion exchange column to obtain the acid K4 polysaccharide;

c) selective protection of the positions 4 and 6 of the galactosamine by dibenzylidenation;

d) protection of the positions 2 and 3 of the glucuronic acid by O-acetylation;

e) deprotection in position 4 and 6 of the galactosamine by removal of the dibenzylidene group by treatment with acetic acid obtaining the intermediate having a structure represented by at least 80% by weight by formula (II)

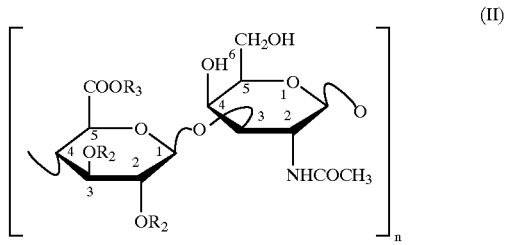

wherein R$_2$ represents an acetyl, R$_3$ represents Na or CH$_3$ and n is an integer number from 5 to 100, and in that said obtained intermediate (II) is then submitted to selective sulfation followed by deprotection to obtain the chondroitin.

2. A process for the preparation of chondroitin sulfates having at least 70% of formula (I), the remainder to 100% consisting of non sulfated chondroitin,

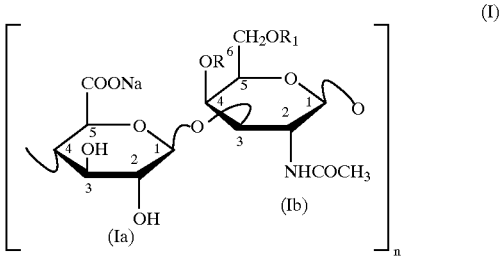

wherein R and $R_1$, same or different, represent H or $SO_3Na$, provided that R and $R_1$ cannot be both H, and n is an integer number ranging from 5 to 50, characterized in that said process uses as a starting material a K4 polysaccharide from *Escherichia coli* and includes the following steps:

a) defructosilation of the K4 polysaccharide by treatment with HCl;
b) selective protection of the carboxyl by formation of the methyl ester;
c) selective protection of the positions 4 and 6 of the galactosamine by dibenzylidenation;
d) protection of the positions 2 and 3 of the glucuronic acid by O-acetylation;
e) deprotection in position 4 and 6 of the galactosamine by removal of the dibenzylidene group by treatment with acetic acid obtaining the intermediate having a structure represented by at least 80% by weight by formula (II)

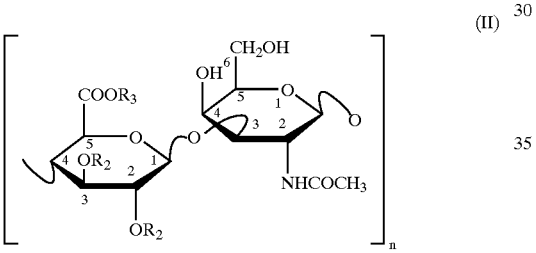

wherein $R_2$ represents an acetyl, $R_3$ represents Na or $CH_3$ and n is an integer number from 5 to 100, and in that said obtained intermediate (II) is then submitted to selective sulfation followed by deprotection to obtain the chondroitin.

3. The process according to claims 1 or 2, characterized in that said defructosilation of the step a) is carried out by acidifying with HCl to pH 2.8 an aqueous solution of K4 polysaccharide having a concentration ranging from 0.5 to 5% and keeping the solution acidified at 20–25° C. for 24–72 hours.

4. The process according to claim 1, characterized in that said ion exchange column of step b) is a column with IR-120 $H^+$ cation exchange resin.

5. The process according to claim 2, characterized in that said methyl ester of step b) is obtained by the reaction of the product of step a) with a mixture of methanol and acetyl chloride at room temperature under stirring for 24 hours.

6. The process according to claims 1 or 2, characterized in that said selective protection of the step c) is carried out by treating the product obtained in step b) dissolved in DMF with benzaldehyde dimethylacetal and melted p-toluensulfonic acid, at 60–80° C. for 4–10 hours.

7. The process according to claims 1 or 2, characterized in that said protection of step d) is carried out by dissolving the product of step c) in acetonitrile, adding triethylamine, acetic anhydride and dimethylaminopyridine and keeping it under stirring for 1–3 hours.

8. The process according to claims 1 or 2, characterized in that said deprotection of the step e) is carried out by treating the product of step d) with an aqueous solution of acetic acid at a temperature equal to 60–80° C. under stirring for 2–5 hours.

9. The process according to claims 1 or 2, characterized in that said selective sulfation of the intermediate (II) to obtain the chondroitin 4,6-disulfate is carried out in anhydrous DMF by treating with pyridine-sulfur trioxide at 40–60° C. for 14–24 hours.

10. The process according to claims 1 or 2, characterized in that said deprotection of the 4,6-disulfate intermediate (II) is carried out with 0.2–0.3 N NaOH at 30–50° C.

11. The process according to claims 1 or 2, characterized in that said selective sulfation of the intermediate (II) to obtain the chondroitin 4-sulfate is carried out in anhydrous DMF by treating with pyridine-sulfur trioxide at 20–25° C. for 14–24 hours.

12. The process according to claims 1 or 2, characterized in that said deprotection of the 4-sulfate intermediate (II) is carried out with 0.2–0.3 N NaOH at 30–50° C.

13. The process according to claims 1 or 2, characterized in that said selective sulfation of the intermediate (II) to obtain the chondroitin 6-sulfate is carried out in anhydrous DMF with pyridine-sulfur trioxide at 0–5° C. for 1–3 hours.

14. The process according to claims 1 or 2, characterized in that said deprotection of the 6-sulfate intermediate (II) is carried out with 0.2–0.3 N NaOH at 30–50° C.

15. A chondroitin sulfate having at least 70% the formula (I) the remainder to 100% consisting of non sulfated chondroitin,

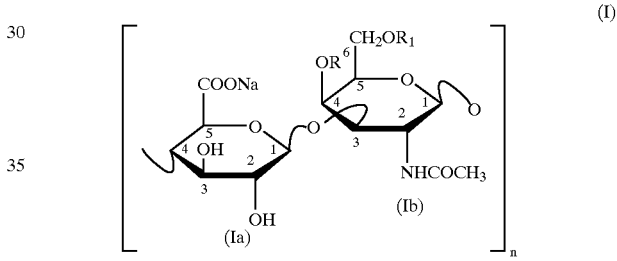

wherein R and $R_1$, same or different, represent H or $SO_3Na$, provided that R and $R_1$ cannot be both H, and n is an integer number ranging from 5 to 50, having a carboxyl/sulfate ratio ranging from 0.7 to 2.

16. The chondroitin sulfate according to claim 15, characterized in that in formula (I), R is $SO_3Na$ ranging from 70 to 90% and $R_1$, is $SO_3Na$ ranging from 10 to 25%, the remaining percentage being H.

17. The chondroitin sulfate according to claim 15, characterized in that in formula (I), R is $SO_3Na$ ranging from 20 to 35% and $R_1$ is $SO_3Na$ ranging from 80 to 95%, the remaining percentage being H.

18. The chondroitin sulfate according to claim 15, characterized in that in formula (I), R is $SO_3Na$ ranging from 80 to 95% and $R_1$ is $SO_3Na$ ranging from 80 to 95%, the remaining percentage being H.

19. The chondroitin sulfate according to claim 15, characterized in that in formula (I), Na is substituted by another cation selected from the group consisting of K, Li, Ca, Mg and Mn.

20. The chondroitin sulfate according to claim 15, having average molecular weight ranging from 10,000 to 25,000 D.

21. The chondroitin sulfate according to claim 15, having average molecular weight ranging from 12,000 to 15,000 D.

22. The chondroitin sulfate according to claim 15, having average molecular weight ranging from 5,000 to 10,000 D.

23. The chondroitin sulfate according to claim 15, having average molecular weight ranging from 6,000 to 8,000 D.

* * * * *

UNITED STATES PATENT AND TRADEMARK OFFICE
CERTIFICATE OF CORRECTION

PATENT NO.    : 6,777,398 B2
DATED         : August 17, 2004
INVENTOR(S)   : Giorgio Zoppetti et al.

It is certified that error appears in the above-identified patent and that said Letters Patent is hereby corrected as shown below:

<u>Column 14,</u>
Lines 25-27, should read:
-- 15. A chondroitin sulfate having at least 70% of formula (I) the remainder to 100% consisting of non sulfated chondroitin, --
Lines 44-47, should read:
-- 16. The chondroitin sulfate according to claim 15, characterized in that in formula (I), R is $SO_3Na$ ranging from 70 to 90% and $R_1$ is $SO_3Na$ ranging form 10 to 25%, the remaining percentage being H. --

Signed and Sealed this

Twenty-second Day of February, 2005

JON W. DUDAS
*Director of the United States Patent and Trademark Office*